(12) United States Patent
Bunce (10) Patent No.: US 10,280,644 B2
(45) Date of Patent: May 7, 2019

(54) PORTABLE DWELLING ASSEMBLY

(71) Applicant: Terry Bunce, Carlisle, IA (US)

(72) Inventor: Terry Bunce, Carlisle, IA (US)

( * ) Notice: Subject to any disclaimer, the term of this patent is extended or adjusted under 35 U.S.C. 154(b) by 249 days.

(21) Appl. No.: 15/346,862

(22) Filed: Nov. 9, 2016

(65) Prior Publication Data

US 2017/0051525 A1 Feb. 23, 2017

Related U.S. Application Data (63) Continuation-in-part of application No. 14/611,451, filed on Feb. 2, 2015, now abandoned.

(60) Provisional application No. 61/935,434, filed on Feb. 4, 2014.

(51) Int. Cl.
| | | |
|---|---|---|
| *E04H 15/44* | (2006.01) | |
| *E04H 15/36* | (2006.01) | |
| *E04H 9/16* | (2006.01) | |
| *E04H 15/56* | (2006.01) | |
| *H02K 7/18* | (2006.01) | |
| *E04H 1/02* | (2006.01) | |
| *E04H 15/54* | (2006.01) | |

(52) U.S. Cl.
CPC ............... *E04H 15/36* (2013.01); *E04H 9/16* (2013.01); *E04H 15/44* (2013.01); *E04H 15/56* (2013.01); *H02K 7/1807* (2013.01); *E04H 1/02* (2013.01); *E04H 15/54* (2013.01)

(58) Field of Classification Search
CPC ......... E04H 15/48; E04H 15/42; E04H 15/12; E04H 1/02; E04H 15/36; E04B 1/34326; E04B 1/34347; E04B 1/3211
See application file for complete search history.

(56) References Cited

U.S. PATENT DOCUMENTS

| | | | | |
|---|---|---|---|---|
| 604,277 | A * | 5/1898 | Tofft | E04B 1/3211 135/906 |
| 2,753,818 | A * | 7/1956 | Green | G03B 21/56 135/119 |
| 3,137,371 | A * | 6/1964 | Nye | E04B 1/3211 482/36 |
| 3,269,398 | A * | 8/1966 | Holbitz | E04H 15/00 135/125 |
| 3,812,632 | A * | 5/1974 | Robertson | E04B 1/3211 52/13 |
| 3,999,337 | A * | 12/1976 | Tomassetti, Jr. | E04B 1/3211 454/334 |
| 4,192,334 | A * | 3/1980 | Daws | E04B 1/3211 135/135 |
| 4,404,980 | A * | 9/1983 | Wade | E04H 15/36 135/117 |
| 4,491,437 | A * | 1/1985 | Schwartz | E04B 1/3211 403/172 |
| 4,784,172 | A * | 11/1988 | Yacoboni | E04B 1/3211 135/87 |
| 5,363,626 | A * | 11/1994 | Hanninen | E04H 15/36 135/122 |

(Continued)

*Primary Examiner* — Gisele D Ford (74) *Attorney, Agent, or Firm* — Zarley Law Firm, P.L.C.

(57) ABSTRACT

A portable dwelling assembly that has a dome shape and a door assembly. The dome assembly is provided with a base ring and top ring connected by a plurality of wall segments. Connected to the exterior of the dome assembly is a covering with optional flaps to allow for greater ventilation. Anchoring devices are attached around the exterior of the dwelling to provide additional stability during adverse weather.

1 Claim, 8 Drawing Sheets

(56) References Cited

U.S. PATENT DOCUMENTS

| | | | | |
|---|---|---|---|---|
| 5,595,203 | A | * | 1/1997 | Espinosa .................. E04H 15/36 135/123 |
| 5,598,668 | A | * | 2/1997 | Isom ........................ A01G 9/16 135/118 |
| 5,908,043 | A | * | 6/1999 | Paes .......................... E04B 1/92 135/115 |
| 6,167,896 | B1 | * | 1/2001 | Smith ...................... E04H 15/36 135/119 |
| 2002/0153034 | A1 | * | 10/2002 | Miller ................... E04B 1/3211 135/130 |
| 2006/0213546 | A1 | * | 9/2006 | Mitsui ..................... E04H 15/42 135/121 |
| 2010/0229905 | A1 | * | 9/2010 | Lin ......................... E04H 15/48 135/96 |
| 2012/0247035 | A1 | * | 10/2012 | Zook ..................... E04B 1/3211 52/81.3 |
| 2013/0276382 | A1 | * | 10/2013 | Workman ............... E04H 15/44 52/63 |

* cited by examiner

PORTABLE DWELLING ASSEMBLY

CROSS REFERENCE TO RELATED APPLICATION

This application is a continuation-in-part of U.S. patent application Ser. No. 14/611,451 filed Feb. 2, 2015, which claims the benefit of U.S. Provisional Application No. 61/935,434 filed Feb. 4, 2014.

BACKGROUND OF THE INVENTION

This invention relates to dwellings. More specifically, this invention relates to a portable dwelling to be used as low cost and easy to setup housing.

Natural disasters have displaced millions. A primary objective of disaster relief is to provide a form of emergency housing to those displaced. Prior to the development of permanent structures, low cost and easy to setup dwellings are used to provide immediate protection from the elements.

Such portable dwellings are old and well known in the art. They suffer from a number of deficiencies. One particular deficiency is that many of the portable dwellings are either difficult to construct, require many small parts or components, involve parts that are difficult to source, or suffer from a combination of these problems. More particularly, many portable dwellings have complicated designs and require a variety of tools to assemble. These types of designs make it difficult, if not impossible, for individuals who are unfamiliar with the portable dwelling to complete assembly. This difficulty is made even worse in emergency situations or in the immediate aftermath of a traumatic event when aid workers are attempting to direct those affected by the situation to assemble the portable dwellings, which in some instances speak a different language.

The use of small parts in many portable dwellings present another difficulty. The risk of loss is greatly raised when a part is small. As such, portable dwellings that rely upon small parts pose the problem of parts getting lost. Given the importance of an individual's dwelling and the potential harm that could be caused by a single missing component to the structure of the dwelling, the reliance on small parts can have a significant impact. At the same time, the loss of parts causes an increase in cost related to replacement due to manufacturing, duplication, and shipping.

This specific problem is especially troublesome when portable dwellings are reused or simply relocated from time to time. During each disassembly and reassembly, there is the potential that a small piece of the portable dwelling will be lost, thereby rendering the entire dwelling assembly unusable.

Similarly, when a variety of parts are used or even a single complex part is used, the ability to source the parts can be difficult. This problem is heightened in areas that have experienced a disaster due to the destruction of hardware stores or the absence of such retail locations in some areas of the world. Furthermore, some areas are so remote that it is difficult to import goods or in some instances, a disaster can result in long delays in importing goods into the area.

While some of these dwellings may be lower-cost and easier to setup, they do not adequately address extreme temperatures or severe weather conditions. For instance, many shelters utilize tenting that requires numerous roping systems to tie down the dwelling. This is problematic in that it cannot withstand high winds and does not provide adequate shelter from extreme conditions. Also, ropes are problematic in that the ropes take up considerable space and present a hazard for individuals moving about that can trip and fall.

In a related problem, dwellings that do provide a modicum of protection from the elements are not mobile. This is the result of the parts being bulky, cumbersome, heavy, or difficult to reassemble which inhibits movement of the dwelling, which is often necessary because of ever-changing conditions caused by a relief effort.

When dwellings are not mobile, it also prevents the dwelling from being transitioned from short to long-term housing. Therefore, another problem present in the art is a dwelling that is suitable for both short and long-term housing, as current dwellings are not designed to either be easily broken down or transitioned to a long-term home.

Thus it is a principal object of the present invention to provide a portable dwelling that improves upon the state of the art.

Another object of the invention is to provide a dwelling that uses a limited number of small parts.

Yet another object of the invention is to provide a dwelling that uses parts that are easily obtained.

Another object of the invention is to provide a dwelling that is easy to assemble.

Yet another object of the invention is to provide a dwelling that can be assembled by anyone.

Another object of the invention is to provide a dwelling that is lightweight.

Yet another object of the invention is to provide a dwelling that has a simple construction.

Another object of the invention is to provide a dwelling that is mobile.

Yet another object of the invention is to provide a dwelling that is configured to transition to a long-term home.

Another object of the invention is to provide a dwelling that has ventilation.

Yet another object of the invention is to provide a dwelling that is low-cost, easy to setup, transport, and reuse.

Another object of the invention is to provide a dwelling that provides improved protection against the elements.

These and other objects, features, and advantages will become apparent from the specification and claims.

BRIEF SUMMARY OF THE INVENTION

A portable dwelling assembly is provided by connecting a plurality of wall segments to a base ring and a top ring. A door assembly is placed between a set of wall segments and a covering is placed on the exterior of the assembly to protect from the elements. In addition, anchoring devices are attached to the covering to add additional weight to the dwelling.

DETAILED DESCRIPTION

With reference to the Figures, a portable dwelling assembly 10 is shown. The portable dwelling assembly 10 has a hemispherical shape and is made of galvanized hollow tubing to avoid rust and to provide a light-weight design after assembly is completed and during transport. In one particular embodiment, the portable dwelling assembly is made of 1.25 inch diameter galvanized tubing to maintain durability and mobility. In other embodiments, the portable dwelling assembly 10 is made of plastic, fiberglass, metal, or any other suitable material that is both durable and lightweight.

The portable dwelling assembly 10 has a base ring 12 that is generally round in shape. The base ring 12 in one arrangement is twelve feet in diameter, but may be of any size. In one embodiment, the base ring 12 is made of a plurality of base ring segments 14 that have a first end 16 and a second end 18.

In one arrangement, the first end 16 of a base ring segment 14 is connected to the second end 18 of a second ring segment 14 by a segment sleeve 20 that is positioned between the ring segments 14 and receives and frictionally engages the respective ends 14 and 16 within the openings 22 in the sleeve 20. In one embodiment the sleeve 20 has a foot 24 that extends outwardly and generally perpendicular to the sleeve openings 22 to add stability to the base ring by engaging the ground.

Alternatively, the feet 24 are attached directly to the base ring 12. The sleeve may also be permanently attached to the second end 18 of the ring segment 14. In an alternative embodiment, the base ring 12 is a continuous body.

In another embodiment, the first end 16 and second end 18 of each base ring segment 14 are friction fit together to one another. In one arrangement, the first end 16 is configured as a male end that engages the second end 18 that is configured as a female end. In one particular arrangement, the male end or first end 16 is crimped or swaged so that the diameter of the male end 16 is received by the female end 18 in a friction fit engagement. In this manner, a limited number of parts are needed and no small parts or tools are necessary to connect the base ring segments 14 to one another. At the same time, the base ring 12 is segmented to facilitate assembly.

The ring segments 14 may also be connected to one another by welding, bolting, screwing, snap fitting, or any other conventional manner. In one particular arrangement, where the male end 16 and female end 18 are in friction fit engagement with one another, the male end 16 and the female end 18 have aligned openings 19 that extend through the base segments 14 that receive a pin 21 through the base segments 14. In this arrangement, the pin 21 provides additional securement between the connected base segments 14 to prevent the base segments 14 from becoming dislodged, pulling apart, rotating, or twisting once connected.

In the event that the pin 21 is lost, a twig or other cylindrical object can be inserted through the aligned openings 19, which makes the replacement of the pin 21 easily obtainable. In comparison, if the pin 21 were replaced with a push pin system, for instance, which is used to connect parts in many conventional systems, the breakage of this piece could render the base ring segment 14, and possibly the entire portable dwelling assembly 10, unusable until another base ring segment 14 is obtained.

Figure 7:
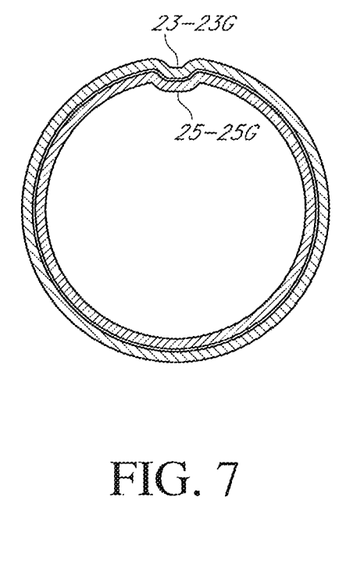
FIG. 7 is a transverse cutaway view of a male groove and female groove of a portable swelling assembly.

In another arrangement, the male end 16 has a female groove 23 and the female 18 has male groove 25. In this configuration, the female groove 23 and the male groove 25 align when the base segments 14 connect with one another in such a manner that the male groove 23 and the female groove 25 interlock with one another, thereby preventing the base segments 14 from twisting, rotating, dislodging, or pulling apart.

Positioned on the top surface of the base ring 12 are a plurality of openings 26. Preferably the openings 26 are spaced three feet apart along the circumference of the base ring 12, but spacing may be of any length. In one embodiment the openings 26 are located on connection sleeves 28 that extend upwardly from the ring segments 14. Alternatively, the connection sleeves 28 can extend upwardly from the segment sleeves 20.

Received within the openings 26 is a bottom end 30 of a plurality of wall segments 32. Preferably, the wall segments 32 frictionally engage the openings 26 but can connect by bolting, screwing, snap fitting, welding, or by any other conventional means.

In an alternative embodiment, the connection sleeves 28 are integral with the base ring segment 14. In one particular embodiment, the connection sleeves 28 are swaged to form male ends that are receive within the bottom end 30 configured as a female end. In one embodiment of this configuration, the connection sleeve or male end 28 of the base ring segment 14 is connected in friction fit engagement by the bottom end or female end 32 of the wall segment 30. In this arrangement, a limited number of parts are needed and the usage of small parts and tools is eliminated, while assembly is facilitated.

In an alternative embodiment where the connection sleeve 28 and the bottom end 30 are connection by friction fit engagement, the connection sleeve 28 and the bottom end have aligned openings 19A that extend through the connection sleeve 28 and the wall segment 32 that receive the pin 21. In this arrangement, the pin 21 provides additional securement between to prevent the connection sleeve 28 and the wall segment 32 from becoming dislodged, palling apart, rotating, or twisting once connected. At the same time, the use of the pin 21 allows for easy replacement in the event the pin 21 is lost.

In another arrangement of the present invention, the connection sleeve 28 has the female groove 23A and the bottom end 30 has the male groove 25A that are in alignment to allow interlocking friction fit engagement. In this manner, the wall segment 32 is prevented from twisting, rotating, dislodging, or pulling apart from the base segment 14.

The wall segments 32 are generally arcuate in shape and extend upwards and are curved towards the center of the base ring 12. The wall segments 32 in one arrangement six feet in height, but may be of any height.

Figure 1:
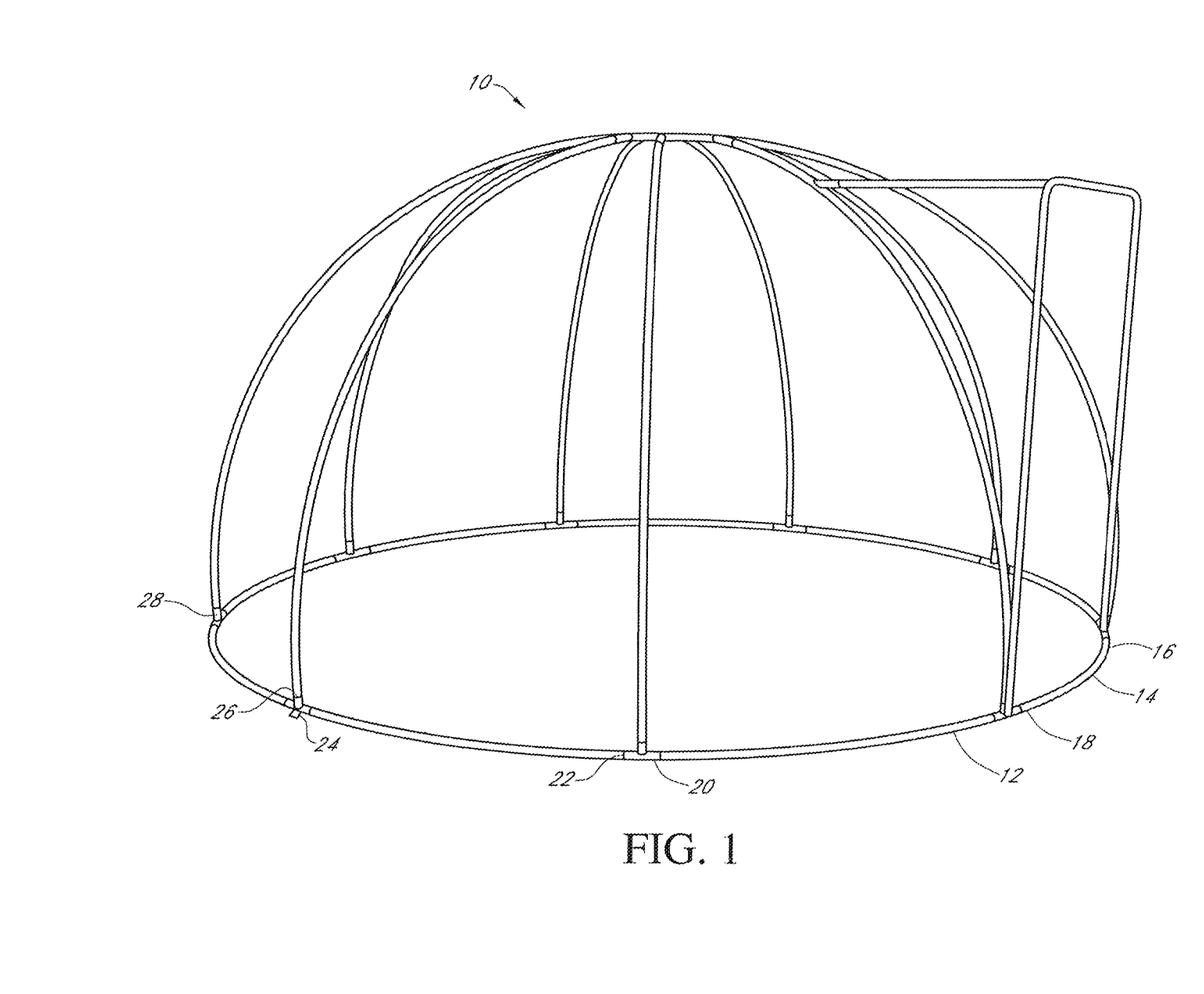
FIG. 1 is a perspective view of a portable dwelling assembly.
Figure 2:
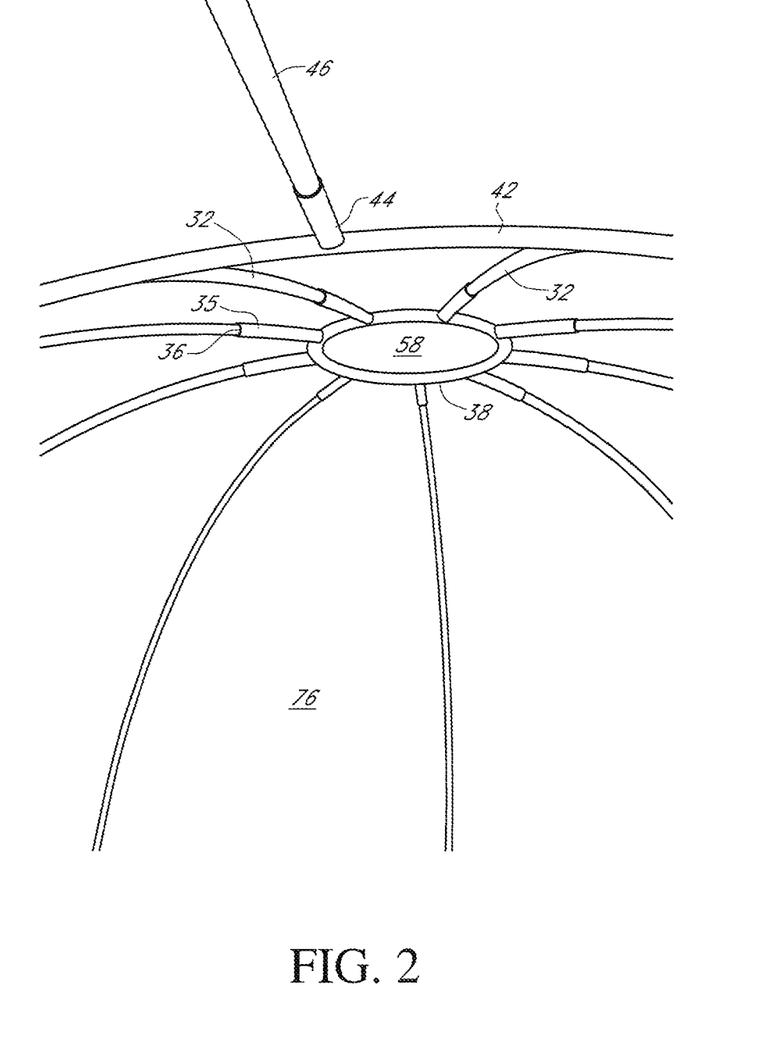
FIG. 2 is a perspective view of a portable dwelling assembly.
Figure 3:
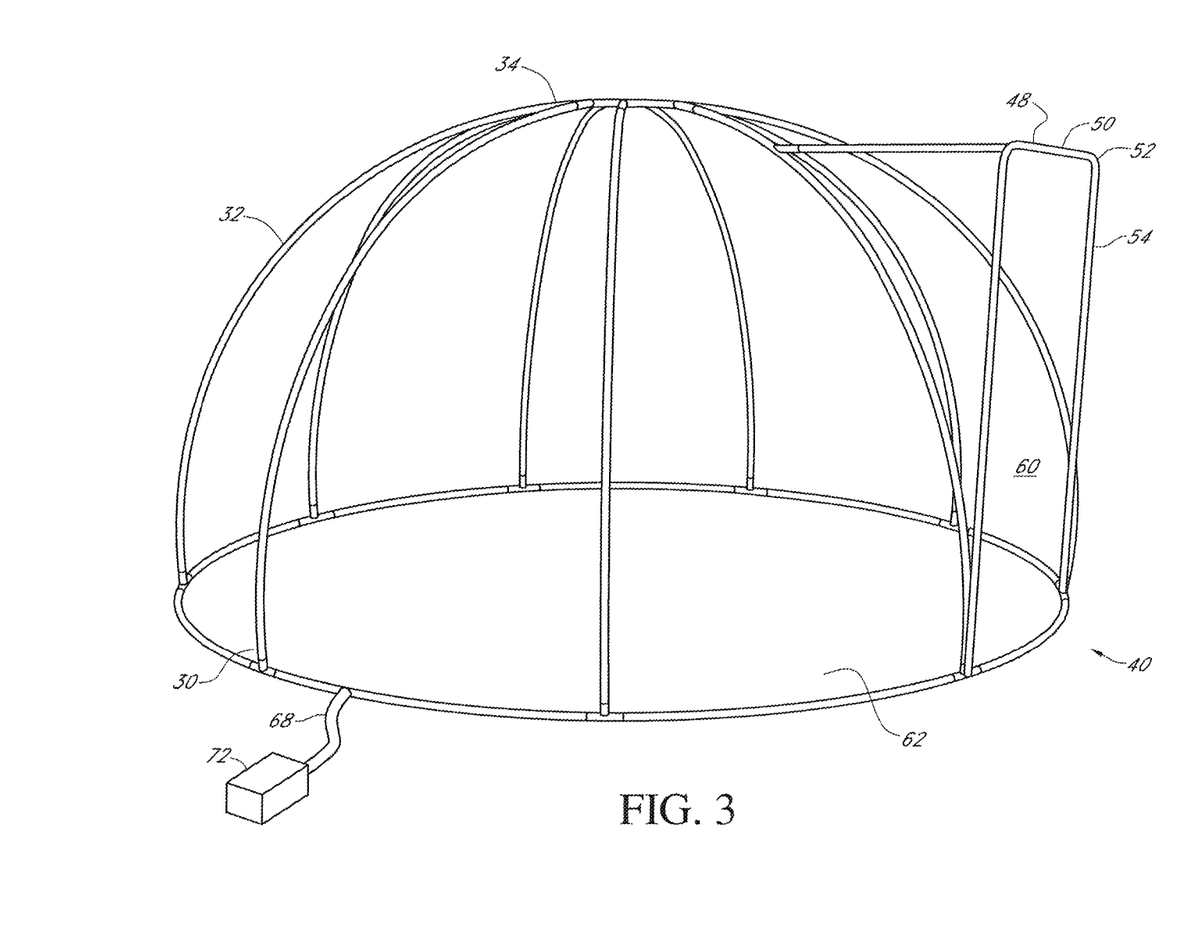
FIG. 3 is a perspective view of a portable dwelling assembly.
Figure 4:
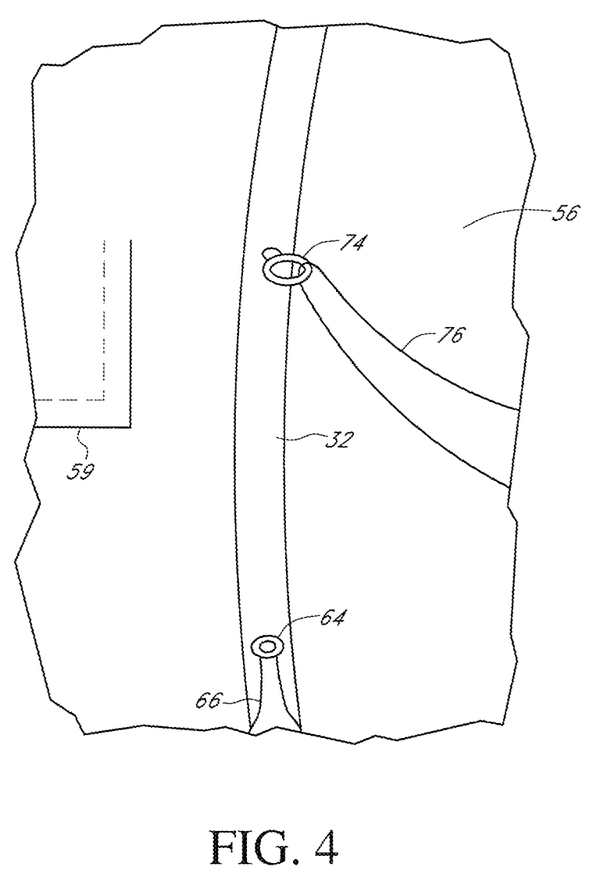
FIG. 4 is a perspective view of a portable dwelling assembly.
Figure 5:
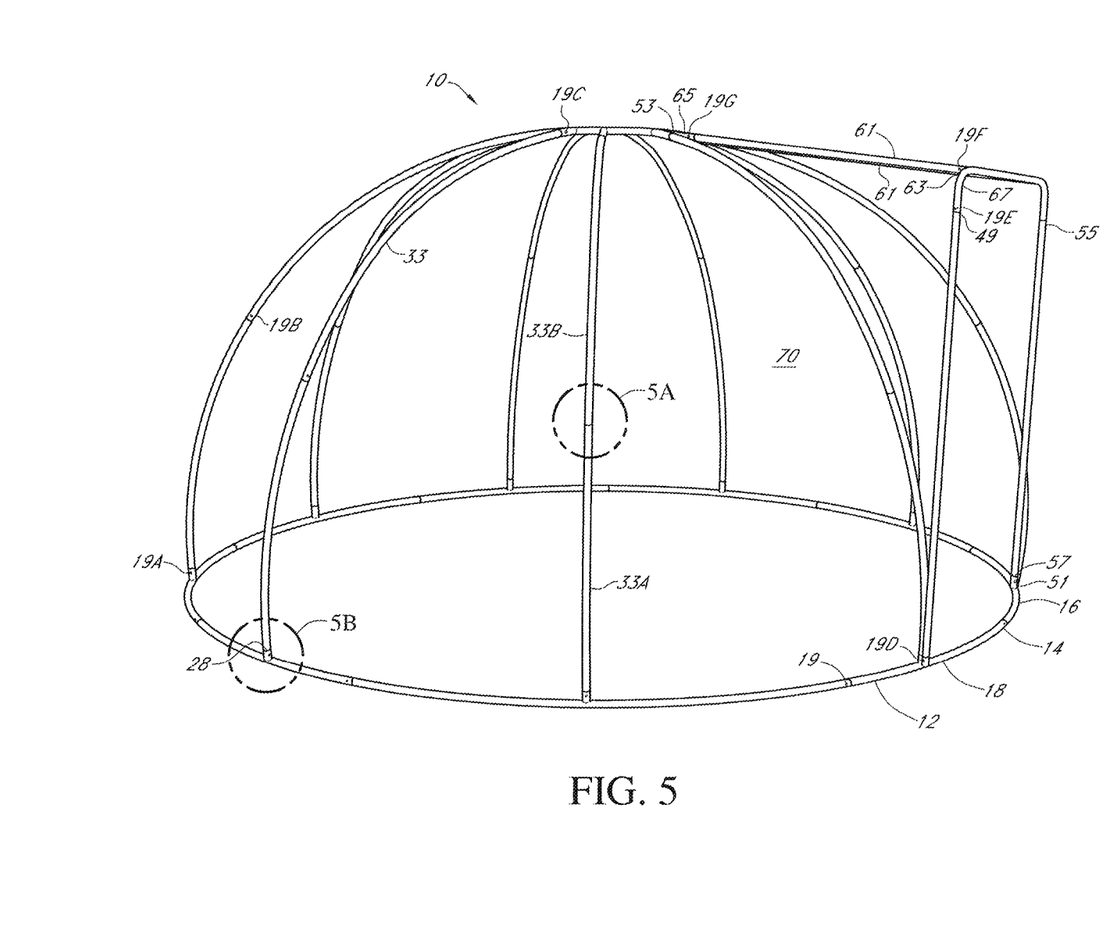
FIG. 5 is a perspective view of a portable dwelling assembly.
Figure 5A:
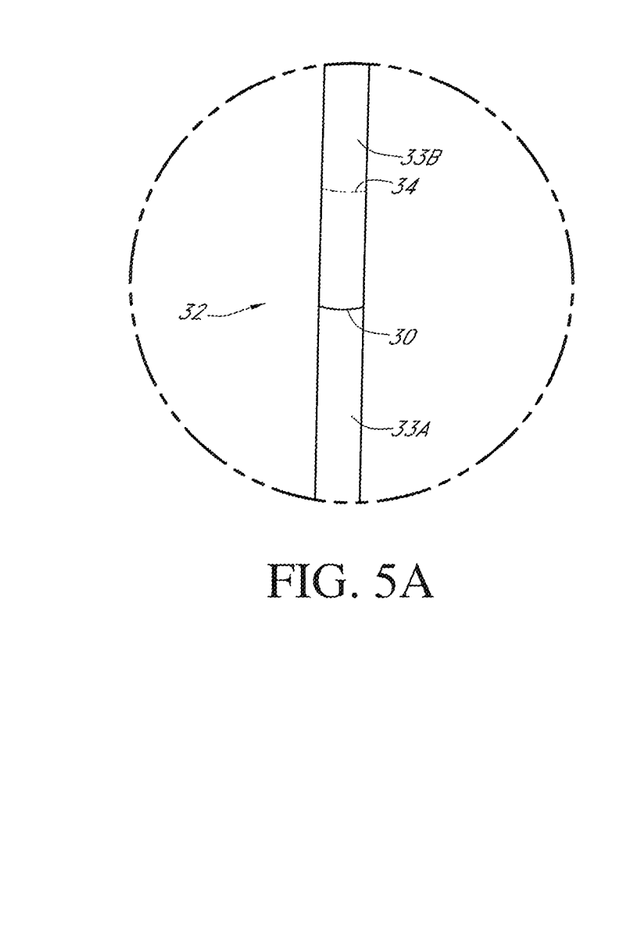
FIG. 5A is a perspective view of a wall segment of a portable dwelling assembly.
Figure 5B:
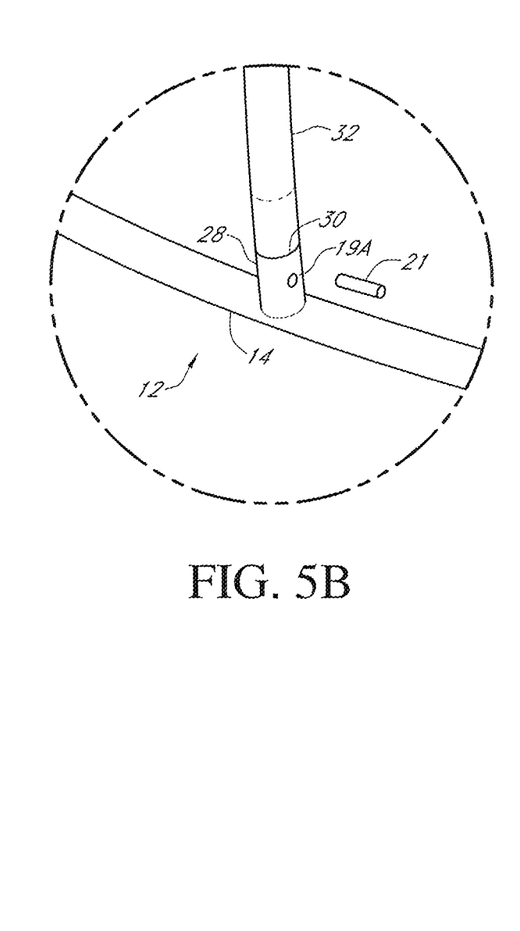
FIG. 5B is a perspective view of a base ring and a wall segment of a portable dwelling assembly.
Figure 6:
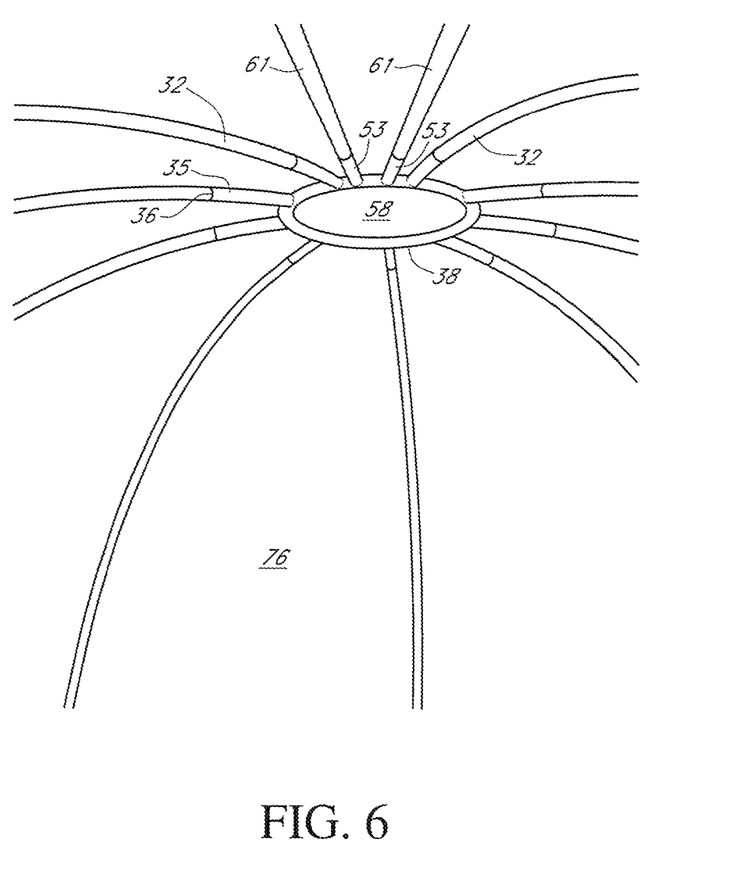
FIG. 6 is a perspective view of a portable dwelling assembly.

In one embodiment of the present invention, the wall segments 32 are split into a plurality of wall portions 33 that are connected to one another instead of one continuous wall segment 32. In example of this arrangement, a first wall portion 33A is connected to the base ring segment 14 at the bottom end 30 of the first wall portion 33A by friction engagement with the connection sleeve 28. The first wall portion 33A has a top end or male end 34 that is swaged to be received in the bottom end 32 of a second wall portion 33B in friction fit engagement such that a wall segment 32 is formed. Although two wall portions 33 are used in this example, more wall portions 33 are contemplated. The use of friction fit engagement prevents the need for small parts and excessive pans, while permitting quick and easy assembly without tools.

In another arrangement of the present invention, the top end 34 and bottom end 30 of each wall portion 33 have openings 19B configured to align and extend through the wall portions when the wall portions 33 are connected to one another. In this arrangement, the pin in received through the wall portions 33 once connected to secure the wall portions 33 together to prevent the wall segment 32 from twisting, dislodging, pulling apart, or rotating.

The wall portions 33 in another arrangement have the female groove 23B in the top end 34 and the male groove 25B in the bottom end 30. In this manner, the aligned and interlocked connection of the female groove 23B and male groove 25B prevent the wall portions 33 from rotating, twisting, dislodging, or pulling part.

In another example of the present invention, the wall segments 32 include a plurality of telescoping wall portions 33.

The top end 34 of the wall segments 32 is connected to a top ring 38 at the apex or top of the portable dwelling assembly 10. The top ring 38 is in parallel spaced alignment with the base ring 12. In one arrangement, the top ring 38 is generally arcuate and rounded in shape The top ring 38 has a plurality of top sleeves 35 that extend outwardly from the top ring 38. In one arrangement, the plurality of top sleeves 35 extend outwardly and downwardly at a slight angle in relation from the horizontal plane. In another embodiment, the top sleeves 35 extend outwardly and downwardly at an arc that matches the arc of the wall segments 32. The top sleeves 35 in one arrangement are integral with to ring 38.

In one arrangement, the top end 34 of the wall segment 32 is received within openings 36 of one of the plurality of top sleeves 35. In one arrangement, the top end 34 is swaged to form a male end that is received in the top sleeve 35 that is configured as a female end such that the connection is friction fit. In this configuration, no small parts or tools are necessary for assembly.

In one arrangement, the top end 34 and the top sleeves 35 have aligned openings 19C that extends through the wall segments 32 and top sleeves 35 to receive the pin 21. The use of the pin 21 allows for easy replacement in the event the pin 21 is lost or broken during assembly or transport.

In another example of the present invention, the top ends 34 have female grooves 23C and the top sleeves 35 have male grooves 25C such that when the top end 34 and top sleeve 35 are connected the female groove 23C and male groove 25C interlock. This arrangement prevents the wall segments 32 from becoming dislodged, pulled apart, twisted, or rotated.

In other arrangements, the top end 34 is connected by bolting, screwing, snap fitting, or any other conventional means. In one embodiment the openings 36 are positioned directly on the surface of the top ring 38 to receive the top end 34 of the wall segments 32 directly.

Positioned between one set of wall segments 32 is a door assembly 40. The door assembly 40 has a cross bar 42 that is connected to a set of wall segments 32 near the top ring 38. The cross bar 42 may be connected to the wall segments 32 by a T-shaped sleeve 44 or by any other conventional manner such as by bolting, screwing, or welding. Near the center of the cross bar 42 is a support bar 46 that extends outwardly at a 90 degree angle from the cross bar 42 and generally perpendicular to the ground. Connected to the end of the support bar 46 is a frame 48, which in one embodiment is U-shaped. The top portion 50 of the frame 48 extends perpendicular to the support bar 46 and parallel to the cross bar 42. At the ends 52 of the top portion 50 of the frame 48 has a set of curved portions 52 that curves downward towards the base ring 12. Extending downward from the curved portions 52 is a set of side portions 54 that extend to openings 26 in the base ring 12.

In an alternative embodiment of the portable dwelling assembly 10 having a door assembly 40, one base ring segment 14 has a pair of base door connectors 51, that in one embodiment extend upwardly from the base ring 12. The use of only one such base ring segment 14 makes it readily identifiable from the other base ring segment 14. In this embodiment, the top ring 38 has a pair of top door connectors 53. In one configuration of this embodiment, the pair of top door connectors 53 angle outwardly and downwardly at angle that is different from the angle of the plurality of top sleeves 35. In one example of this configuration, the pair of top door connectors 53 angle outwardly and downwardly at angle that is between horizontal and the angle at which the plurality of top sleeves 35 angle.

Connected to and extending upwardly from the pair of base door connectors 51 are the side portions 54. In one particular arrangement, the side portions 54 extend upwardly along a vertical plane such that the door assembly 40 of one dwelling assembly 10 is configured to abut the door assembly 40 of another dwelling assembly 10 in near or complete engagement. In this configuration, dwelling assemblies 10 can be linked together with one another, thereby allowing for communal settings, such as medical facilities and lunch halls, as well the accommodation of larger families.

In one embodiment, the side portions 54 are separate from frame 48 to facilitate assembly and packaging, but in other embodiments are integral to reduce the number of parts to assemble. The side portions 54 have a bottom end 55 and a top end 57. The bottom end 57 in one arrangement is configured as a female end to be received over one of the base door connectors 51, which in one embodiment is configured as a male end, for example by swaging, to allow for friction fit connection without the use of tools or other parts.

In other arrangements, aligned openings 19D extend through the base door connectors 51 and the bottom ends 57 to receive the pin 21. In any of these embodiments, the side portions 54 are secured in place thereby preventing twisting, rotating, dislodging, or pulling apart. In alternative embodiments, female grooves 23D and male grooves 25D are positioned within the base door connectors 51 and bottom ends 57 respectively to allow interlocking securement.

Connected to the top ends 55, which in one embodiment are configured as male ends are the curved portions or corners 52 of the top portion 50. The corners 52 receive the top ends 55 of the side portions 54 in a pair of female ends 49 in friction fit engagement to eliminate the needs for tools or small parts. In one arrangement, the female ends 49 and the top ends 55 have aligned openings 19E that extends through the pair of female ends 49 and the side portions 54 to receive pin 21, which can be replaced by any suitable cylindrical object in the event the pin 21 is lost or broken. In other embodiments of the present invention, female grooves 23E and male grooves 25E are crimped into the top ends 55 and the female ends 55, respectively, for interlocking engagement.

In one embodiment, a pair of ceiling segments 61 having a bottom end 63 and the top end 65 extend from and between each of the corners 52 and the top ring 38. In one arrangement, the corners 52 have corner connection members 67 that extend upwardly and inwardly towards the top ring 38 and in one embodiment are configured as male ends. The bottom end 63 of one of the pair of ceiling segment 61 is received over one of the corner connection members 67 in friction fit engagement. In one embodiment, aligned openings 19E extend through the corner connection segment 67 and the bottom end 63 to receive the pin 21. Alternatively, female grooves 23F and male grooves 25F are used for connection to prevent twisting, rotating, pulling apart, and dislodging.

The top end 65, which in some embodiments is configured as a male end by swaging or the like, is connected to one the top door connectors 53 of the top ring 38. In one embodiment, the top end 65 is received in the top door connector 53, which is configured as a female end in friction fit engagement to remove the need for tools or small part. Alternatively, aligned openings 19G extend through the top door connectors 53 and the top end 65 to receive the pin 21 to hold the ceiling segment 61 in place. In another embodiment, female grooves 23G and male grooves 25G are used to provide interlocking engagement.

Connected to the exterior of the portable dwelling assembly 10 is a covering 56 that in one embodiment is a one-piece cover made of vinyl coated polyester, but may be made of any durable and weather resistant material. For cold weather climates the covering 56 may be made of bubble wrap and foil to provide insulation. In an alternative embodiment the covering 56 may be made of numerous pieces connected together to cover the exterior of the portable dwelling assembly 10. The covering 56 may be attached to the dome assembly 10 by gluing, stitching, tying, or heating the covering so it adheres to the portable dwelling assembly 10.

In one embodiment, the covering 56 is made of a mesh or vinyl material capable of being adhered to be concrete or other composite material 78 (not shown) that is used to build sustainable shelter. In this manner, the portable dwelling assembly 10 can retained in the current position or transitioned to a desired location by its inhabitants. Thereafter, concrete can be adhered to the covering, which will harden thereby transitioning the portable dwelling assembly 10 into a long-term home.

In one embodiment the covering 56 does not cover an opening 58 of the top ring 38. The covering 56 may also have a flap 59 cut in the covering 56. This allows the opening 58 to be used for ventilation or for a heating stack.

The covering 56 may be attached to leave an opening 60 in the door assembly 40 for additional ventilation in warmer climates. In an alternative embodiment the covering 56 may cover the door opening 60 but can be removed by conventional means such as Velcro, buttons, or tying. For additional ventilation, additional flaps 59 may be cut into the covering 56.

Attached to the covering 56 is a floor 62 that covers the interior of the dwelling assembly 10 below the base ring 12. The floor 62 may be included in the one-piece covering 56 or a separate piece of material.

Positioned around the exterior of the covering 56 are a plurality of attachment devices 64 that either connect directly to the portable dwelling assembly 10 or to the covering 56. The attachment devices 64 connect to a plurality of anchor devices 66 made of any heavy object such as buckets or sandbags to prevent the portable dwelling assembly 10 from being overturned by adverse weather conditions. In one embodiment, the attachment devices connect to anchors 66 that are placed within the ground to hold the portable dwelling assembly 10 in place.

The attachment devices 64 in another embodiment are vinyl straps that connect to the covering 56 and the base ring 12 and wall segments 32 to hold the covering 56 in place.

An electric conduit 68 may pass through the covering 56 to the interior 70 of the portable dwelling assembly 10. The electric conduit 68 can bring in electrical power from portable generators 72.

Attached to the interior surface of the wall segments 32 are reinforcing loops 74. The reinforcing loops 74 can be used to hang items including a hammock 76 within the interior 70 of the portable dwelling assembly 10.

In operation, an individual connects the first end 16 of base ring segments 14 into the openings 22 of sleeves 20 on the second end 18 of other base ring segments 14 until a base ring 12 is formed. Wall segments 32 are connected to the base ring 12 by inserting the bottom ends 30 of the wall segments 32 into the openings 26 of connection sleeves 28. The top ends 34 of the wall segments 32 are then inserted into top sleeves 35 positioned around the top ring 38. Next, a cross bar 42 is positioned between two wall segments 32. A support bar 46 is then connected to a t-shaped sleeve 44 located on the cross bar 42. A U-shaped frame 48 is then connected to the cross bar 42 and the side portions 54 of the frame 48 are placed within openings 26 in the base ring 12 to form the door assembly 40. The individual then attaches the covering 56 and floor 62 to the exterior of the portable dwelling assembly 11. Anchoring devices 66 are then attached to the exterior of the covering 56 by attachment devices 64.

In one particular mode of operation of the present invention, the assembly of the portable dwelling assembly 10 involves the connection of all male ends that extend in a generally upwardly extending direction that are received in all female ends that extend in a generally downwardly extending direction. In this mode of operation, no tools or small parts are necessary for construction. Additionally, the use of this particular arrangement is uniquely beneficial in that it prevents rain and other forms of moisture from entering into the interior of the hollow tubing used to form the dwelling assembly 10.

Thus provided is a dwelling assembly 10 that uses a limited number of small parts, that uses parts that are easily obtained, is easily setup and assemble, is lightweight, can be transitioned into a long-term home, improves protection against the elements, is low cost, and is portable. In addition, the geodesic shape of the assembly 10 provides improved weather resistance and improved circulation over previous portable dwellings. Further, the door assembly 40 and optional flaps 59 provide for additional ventilation. Finally, the placement of anchoring devices 66 placed around the exterior of the assembly 10 provides for additional stability in harsh conditions.

From the above discussion and accompanying figures and claims it will be appreciated that the portable dwelling assembly 10 offers many advantages over the prior art. It will be appreciated further by those skilled in the art that other various modification could be made to the device without porting from the spirit and scope of this invention. All such modifications and changes fall within the scope of the claims and are intended to be covered thereby. It should be understood that the examples and embodiments described herein are for illustrative purposes only and that various modifications or chorales in the light thereof will be suggested to persons skilled in the art and are to be included in the spirit and purview of this application.

What is claimed:

1. A portable dwelling assembly comprising:
a top ring;
a base ring;
a plurality of wall segments with top male ends and female bottom ends connected to the top ring and base ring by friction fit engagement, wherein the top male ends of the plurality of wall segments is received in a plurality of female ends of the top ring and the bottom female ends of the plurality of wall segments is received over a plurality of male ends of the base ring such that when assembled rainwater cannot enter the top ring, base ring, and the plurality of wall segments; and
a covering connected to the plurality of wall segments.

* * * * *